(12) United States Patent
Shen

(10) Patent No.: US 7,049,363 B2
(45) Date of Patent: May 23, 2006

(54) MATERIAL SYSTEM FOR USE IN THREE DIMENSIONAL PRINTING

(75) Inventor: Jialin Shen, Blaustein (DE)

(73) Assignee: DaimlerChyrsler AG (DE)

( * ) Notice: Subject to any disclaimer, the term of this patent is extended or adjusted under 35 U.S.C. 154(b) by 680 days.

(21) Appl. No.: 09/870,286

(22) Filed: May 30, 2001

(65) Prior Publication Data

US 2002/0016387 A1 Feb. 7, 2002

(30) Foreign Application Priority Data

May 30, 2000 (DE) ............................... 100 26 955

(51) Int. Cl.
*C08K 3/00* (2006.01)
(52) U.S. Cl. ...................... 524/500; 524/502; 524/530; 524/548
(58) Field of Classification Search ................ 524/500, 524/502, 530, 548
See application file for complete search history.

(56) References Cited

U.S. PATENT DOCUMENTS

| | | | |
|---|---|---|---|
| 4,221,859 A * | 9/1980 | Fanger et al. .................. | 522/65 |
| 5,270,368 A * | 12/1993 | Lent et al. .................. | 524/236 |
| 5,501,942 A * | 3/1996 | Salvin et al. ............ | 430/280.1 |
| 5,885,338 A | 3/1999 | Nigam et al. | |
| 6,143,852 A | 11/2000 | Harrison et al. | |
| 6,743,521 B1 * | 6/2004 | Hubbell et al. ............. | 428/500 |

FOREIGN PATENT DOCUMENTS

| | | |
|---|---|---|
| DE | 198 48 896 A1 | 4/2000 |
| WO | WO 97/31782 | 9/1997 |
| WO | WO 99/47252 | 9/1999 |
| WO | WO 99/54143 | 10/1999 |

\* cited by examiner

*Primary Examiner*—Edward J. Cain
(74) *Attorney, Agent, or Firm*—Akerman Senterfitt; Stephan A. Pendorf; Nicholas A. Zachariades

(57) ABSTRACT

A material system for use in a 3D-printing, which exhibits a higher form stability. The material system contains binder and solvent as well as optional filler materials. The binder is soluble in the solvent, as well as two complementary polyelectrolytes, and/or an initiator for a cross linking reaction of the binder. The advantage of such a mixed material system is comprised in the essentially higher binder force between the individual particles. This enhanced binder force results either from the acid-base linkages, which form between the complementary polyelectrolytes, or from the supplemental networking initiated by the initiators, or from both. Substantially higher binding forces between the individual particles means at the same time a substantially higher shape stability of the 3D-printing product.

14 Claims, No Drawings

MATERIAL SYSTEM FOR USE IN THREE DIMENSIONAL PRINTING

BACKGROUND OF THE INVENTION

1. Field of the Invention

The invention concerns a material system for use in 3D-printing

2. Description of the Related Art

A material system of this general type is already known from WO 98/09798.

In manufacturing technology and in particular in industrial model construction new types of more rapid production methods are constantly being developed. One group of this type of rapid manufacturing processes is referred to as rapid-prototyping-processes. This group includes the three dimensional or 3D-printing.

3D-printing, according to WO 98/09798, is a process in which a powder type material system, comprised of filler material and binder, are bonded to each other in successive layers. For this the powder is applied in successive layers and the powder layer is "printed" with a solvent, which activates the binder and therewith adheres the filler material. Thereby there results a cross-sectional view of a construction component. As soon as this is finished, a new powder layer is applied and is newly "printed". This process is repeated so long until an entire construction component has been completed.

The construction component produced by this type of process possesses a low form stability, so that they are liable to breakage or distortion during the subsequent handling of the construction component. A further consequence of this type of low form stability is that larger construction components under certain conditions cannot be constructed as a single piece, even if, in the future, machines with large construction spaces are made available. Larger construction components would break as a result of their low form stability and due to the load of their own weight. This applies in particular for materials with high density. But even for small parts with high quality requirements, in particular with fine or filigreed structures, the shape stability must be increased.

SUMMARY OF THE INVENTION

The task of the present invention is comprised of providing a material system for use in a 3D-printing, which exhibits a higher form stability and strength.

The invention, with respect to the material system to be produced, is set forth in the characteristics of Patent claim 1.

DETAILED DESCRIPTION OF THE INVENTION

The task, with respect to the material system to be produced for use in a 3D-printing is inventively solved thereby, that the material system
  contains binder and solvents as well as optional filler materials,
  wherein the binder is soluble in the solvent,
  as well as
  two complementary polyelectrolytes
  and/or
  an initiator for initiating a crosslinking reaction in the binder.

The advantage of such a mixed material system is comprised in the high binding force between the individual particles. This high binding force results either from the acid-base bonds, which form between the complementary electrolytes, or from the supplemental crosslinking initiated by the initiator, or from both. Suitable initiators include for example, known photoinitiators or also thermoinitiators, for example peroxide. Higher binder forces between the individual particles means, at the same time, a higher form rigidity or strength of the 3D-printing product. This makes possible the production of larger, thinner-walled and more filigreed components, which result in higher precision and thus less post-working requirement and also less defects, as well as employability in a broader material spectrum.

In one advantageous embodiment of the inventive material system the two complementary polyelectrolytes are contained in two binders or in a binder and a solvent. The respective acid-base reaction is first initiated upon contact between the binder and solvent. Thereby, the individual components of the material systems are easy to store and work with.

In a further advantageous embodiment of the inventive material system the initiator is contained in the solvent or in the binder or binders. This guarantees a good and targeted distribution within the material system and at the same time a simple activation of the photoinitiator. The activation can occur by short duration illumination of respectively one material layer during the 3D-printing process.

In another advantageous embodiment of the inventive material system the filler material is coated with a binder. Processes for a coating of this kind are known to those working in this art. With binder-coated filling materials there comes the possibility of a more even distribution of the binder than by a simple mixing of these two components, and therewith an improved form stability over the entire construction component.

Preferably a first filler material is coated with an acidic polyelectrolyte and a second filler material (same or different type) is coated with a complementary basic polyelectrolyte. Thereafter, the two types are mixed.

For fine casting or precision casting applications a residual ash poor material system is also advantageous.

This could be explained using an example of a so-called precision casting technique. Therein, first a positive original model of the construction component is produced. From this positive original a negative shape is produced by a casting step with ceramic clay. For the production of the actual construction component the original model must be removed from the negative form or mold. The removal of the original model out of the precision casting mold occurs using the so-called "flash fire" process, that is, by a very rapid temperature increase. This process produces satisfactory results for many applications of fine casting technology. In applications which require very narrow cavities in the mold and high quality surfaces of the end product, there occur however problems. The material of the original shape is not completely removed out of the mold. This can be traced back to residual ash. The use of a residual-ash-poor material system solves this problem. The term "residualash-poor" as used herein means less than 0.2 weight percent with respect to the original weight. The residual ashes should be produced in the form of fine powder or dust. For this, in accordance with the invention, (almost) residual ash free (<0.1 weight %) filler materials, binders and solvents (preferably without inorganic components) are employed. A complete absence of residual ashes of the material system is not always possible, since included among additives (for example wetting agents) are those with inorganic components (for example Zn- or Al-sterate) which are added in order to make possible the employment of the material system for the 3D-printing.

Also advantageous is a material system which flows in an autoclave, in particular in an autoclave as conventionally employed in fine casting technology.

A further method for removing of the original model out of the fine cast mold comprises introducing both into an autoclave and to apply increased pressure (>5 bar) and temperature (>150° C.). Suitable materials, for example wax or low molecular weight polymers, are flowable under these conditions. That means, the original shape is fluidized and can flow out of the ceramic mold. Included therein is a necessary supplemental firing, in order to remove residual materials out of the narrow cavities.

Also advantageous is a material system, in which at least a substantial part of the filler material and binder is in the form of rounded-off particles.

This makes it possible to completely or almost completely dispense with wetting agents, and thus reduces the amount of wetting agent content. Beyond this, it improves the surface quality of the construction component and reduces the necessary coating thickness. Research has shown that the construction component precision increases and the post-casting or follow-up work requirement is reduced.

Particularly advantageous is one such material system, in which the average or mean particle diameter is smaller than approximately 40 µm. In a material system, in which the particle diameter is smaller than approximately 30 µm, construction components with a surface granularity or roughness of Ra<=6 µm can be produced.

Also advantageous is a material system in which the filler material is comprised of wax, PS, PMMA or POM. These materials exhibit a sufficiently high strength or rigidity for a 3D-printing product, are almost residual-ash-free and exhibit at the same time a good suitability for the "flash fire" and/or autoclave process. PMMA-powder exhibits, beyond this, depending upon the manufacturing process via polymerization, almost ideal round particles.

Also advantageous is a material system in which the binder is comprised of a water-soluble polymer, preferably of polyvinyl pyrrolidone (PVP). This could be a homo- and/or co-polymer or even a blend. Particularly suitable are two complementary polyelectrolytes, for example basic and acidic PVP. A water-soluble binder is to be preferred for environmental considerations and with respect to the health endangerment potential for the operating personnel compared to binders which require other solvents. PVP is water soluble and almost residual ash free.

Also advantageous is a material system (with high binder force and rounded off particles), in which the proportion of binder in the material system is less than approximately 10 weight percent. Thereby a sufficient binding is guaranteed and at the same time, with the reduction in binder component, the swelling behavior of the material system is lowered. This again minimizes the manufacturing defects in the construction geometry and improves the structural stability.

Also advantageous is an inventive material system with increased binder force, in which the filler material is comprised of metal, ceramic or carbide. Conventionally employed binders are not capable of binding these types of materials with high density, in order to compensate for loads on the basis of their own weight, and are thus not capable of providing sufficient structural stability. The present materials however exhibit a high stability and rigidity and produce together with the new binder a 3D-printing product (for example metal-matrix-composite), which unlocks completely new fields of application, for example for injection molded tools or electrodes.

In the following the inventive material system will be described in greater detail on the basis of the illustrative examples:

The material system contains a PMMA-copolymer-powder as filler. The powder comprises particles with an average diameter of approximately 35 µm as well as having a rounded-off spherical shape. Added to the PMMA-powder is a wetting agent in the amount of 0.05 weight percent in the form of inorganic Zn- or Al-syearate, which represents the major portion of the residual ash content.

The material system contains, besides this, two binders in the form of an acidic and a basic PVP-polyelectrolyte. A portion of the PMMA-powder is coated with the acidic binder, the other portion with the basic. The coated PMMA powders are mixed with each other in equal measure. PVP is almost residual-ash-free and water-soluble. The filler material PMMA is chemically compatible with the PVP binder.

The material system employs water as solvent. Water is harmless, environmentally friendly and economical.

The material system has a residual ash content of less than 0.05%.

During the 3D-printing process the two binders are activated by the water solvent and form stable acid-basecomplexes, via which the individual particles are bonded to each other.

The inventive material system in the embodiment of the above described example demonstrates itself to be particularly suitable for application in precision casting technology, since it has a good shape stability as well as a low residual ash content and, on the basis of the fine particle size and almost round particles, makes possible products with a good surface quality.

Further, the filler material and the two binders exhibit a good chemical compatibility, the filler material exhibits a high stability and rigidity, and the two complementary binders exhibit a very high binding force, whereby this material system qualifies as particularly suitable for original models.

Molding original models additionally require a sufficiently high temperature resistance.

Although the invention has been described in detail with reference to a described embodiment, it is not to be considered limited thereby, but rather can be broadly applied and above all in the areas of rapid prototyping.

What is claimed is:

1. A two or more component material system for use in 3D-printing comprising:
   a first component comprising a liquid solvent,
   a second component separate from said first component and comprising dry particles comprising binder soluble in the solvent, and
   optionally, filler materials in the form of particles as a third component or in said first or second component,
   wherein the material system further contains two complementary polyelectrolytes and/or an initiator for a crosslinking reaction of the binder, and
   wherein the two complementary polyelectrolytes are contained separately in
   (i) two binders, respectively, or
   (ii) in a binder and in the solvent.

2. A material system according to claim 1, wherein the initiator is contained in the solvent or in the one or both binders.

3. A material system according to claim 2, wherein the initiator is a photoinitiator.

4. A material system according to claim 1, wherein the filler particles are coated with the binder.

5. A material system according to claim 1, wherein the material system is residual-ash-poor.

6. A material system according to claim 1, wherein the material system following 3D-printing is flowable in an autoclave.

7. A material system according to claim 1, wherein at least a substantial portion of the filler material and binder particles is in the form of rounded-off particles.

8. A material system according to claim 7, wherein average particle diameter of said particles is smaller than approximately 40 μm.

9. A two or more component material system for use in 3D-printing comprising:
- a first component comprising a solvent,
- a second component comprising binder particles soluble in the solvent, and
- optionally, filler materials in the form of particles as a third component or in said first or second component,
- wherein the material system contains two complementary polyelectrolytes and/or an initiator for a crosslinking reaction of the binder, and
- wherein the filler material is comprised of wax, PS, PMMA or POM.

10. A material system according to claim 1, wherein the filler material is comprised of metal, ceramic or carbide.

11. A material system according to claim 1, wherein the binder is comprised of a water-soluble polymer.

12. A material system according to claim 11, wherein the water-soluble polymer is PVP or a copolymer thereof.

13. A two or more component material system for use in 3D-printing comprising:
- a first component comprising a liquid solvent,
- a second component separate from said first component and comprising dry particles comprising binder soluble in the solvent, and
- optionally, filler materials in the form of particles as a third component or in said first or second component,
- wherein the material system further contains two complementary polyelectrolytes and/or an initiator for a crosslinking reaction of the binder, and
- wherein the binder comprises less than 10 weight percent of the material system.

14. A process for producing a three dimensional shape, the process comprising:
- (a) providing a layer of solvent-soluble dry particles comprising binder and, optionally, filler materials,
- (b) printing said layer with a liquid solvent in a pattern to activate said binder,
- (c) repeating steps (a) and (b) until said three-dimensional shape is formed,
- wherein the material system comprised of binder, solvent and optionally filler materials contains two complementary polyelectrolytes and/or an initiator for a crosslinking reaction of the binder.

* * * * *